(12) United States Patent
Huang et al.

(10) Patent No.: US 12,056,240 B2
(45) Date of Patent: *Aug. 6, 2024

(54) METHOD AND APPARATUS FOR MANAGING HARDWARE RESOURCE ACCESS IN AN ELECTRONIC DEVICE

(71) Applicant: Futurewei Technologies, Inc., Plano, TX (US)

(72) Inventors: Paihan Huang, Los Altos, CA (US); Maoter Chen, Santa Clara, CA (US); I-Hsuan Yang, Santa Clara, CA (US)

(73) Assignee: Futurewei Technologies, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 17/062,132

(22) Filed: Oct. 2, 2020

(65) Prior Publication Data

US 2021/0019410 A1 Jan. 21, 2021

Related U.S. Application Data

(63) Continuation of application No. 15/795,101, filed on Oct. 26, 2017, now Pat. No. 10,853,490.

(51) Int. Cl.
*G06F 21/56* (2013.01)
*G06F 21/52* (2013.01)
*G06F 21/82* (2013.01)

(52) U.S. Cl.
CPC .......... *G06F 21/566* (2013.01); *G06F 21/52* (2013.01); *G06F 21/82* (2013.01); *G06F 2221/033* (2013.01)

(58) Field of Classification Search
CPC ........ G06F 21/566; G06F 21/52; G06F 21/82; G06F 2221/033
See application file for complete search history.

(56) References Cited

U.S. PATENT DOCUMENTS

| 8,656,465 | B1 | 2/2014 | Fong-Jones | |
| 8,918,834 | B1 * | 12/2014 | Samuelsson | H04L 63/20 726/1 |
| 8,984,274 | B1 | 3/2015 | Kerzner et al. | |
| 9,230,134 | B1 | 1/2016 | Grigera | |
| 9,413,778 | B1 * | 8/2016 | Elisha | H04L 63/1425 |

(Continued)

FOREIGN PATENT DOCUMENTS

| CN | 103077335 A | 5/2013 |
| CN | 103246834 | 8/2013 |

(Continued)

OTHER PUBLICATIONS

Martin Georgiev et al "Rethinking Security of Web-Based System Applications", ACM, 2015, p. 366-376. (Year: 2015).*

(Continued)

*Primary Examiner* — Catherine Thiaw
(74) *Attorney, Agent, or Firm* — Fish & Richardson P.C.

(57) ABSTRACT

Embodiments provide methods and apparatuses to manage hardware resource access on a mobile device comprising detecting an attempt by the first application to access the first hardware resource when the application is executing in the background and determining that there is not a policy for the first application to access the first hardware, providing a notification requesting user input thereof, and adding a new policy accordingly.

27 Claims, 5 Drawing Sheets

(56) References Cited

U.S. PATENT DOCUMENTS

| | | | |
|---|---|---|---|
| 9,576,130 | B1 | 2/2017 | Book et al. |
| 10,114,944 | B1 | 10/2018 | Li et al. |
| 2010/0328064 | A1 | 12/2010 | Rogel |
| 2012/0009896 | A1 | 1/2012 | Shamik et al. |
| 2012/0167218 | A1 | 1/2012 | Poornachandran et al. |
| 2012/0204235 | A1 | 8/2012 | Jaudon et al. |
| 2012/0291103 | A1 | 11/2012 | Cohen |
| 2013/0055387 | A1 | 2/2013 | Kim et al. |
| 2013/0055411 | A1 | 2/2013 | Yang et al. |
| 2013/0067388 | A1 | 3/2013 | Celie et al. |
| 2013/0097517 | A1 | 4/2013 | Reiss et al. |
| 2013/0152192 | A1 | 6/2013 | Dischamp |
| 2013/0246470 | A1 | 9/2013 | Price et al. |
| 2013/0254831 | A1* | 9/2013 | Roach ............. H04W 12/082 726/1 |
| 2014/0089538 | A1* | 3/2014 | Bachrany ............. G06F 3/00 710/37 |
| 2014/0196158 | A1 | 7/2014 | Buck et al. |
| 2015/0006761 | A1* | 1/2015 | Miller ............. G06F 13/122 710/3 |
| 2015/0127829 | A1 | 5/2015 | Biswas |
| 2015/0304848 | A1 | 10/2015 | Kim et al. |
| 2015/0339482 | A1 | 11/2015 | Wurster |
| 2016/0119358 | A1 | 4/2016 | Oren et al. |
| 2016/0191534 | A1 | 6/2016 | Mallozzi et al. |
| 2016/0219438 | A1 | 7/2016 | Ward et al. |
| 2016/0232344 | A1 | 8/2016 | Chung |
| 2017/0011215 | A1 | 1/2017 | Poiesz et al. |
| 2017/0012981 | A1 | 1/2017 | Obaidi et al. |
| 2017/0032143 | A1 | 2/2017 | Kong et al. |
| 2017/0118610 | A1* | 4/2017 | Schieman ........... G06F 11/3466 |
| 2017/0118611 | A1 | 4/2017 | Schieman et al. |
| 2017/0249560 | A1* | 8/2017 | Cudak ................. G06F 21/554 |
| 2017/0272904 | A1 | 9/2017 | Shepherd et al. |
| 2018/0293474 | A1 | 10/2018 | Almog |
| 2019/0034624 | A1 | 1/2019 | Chen et al. |
| 2019/0065711 | A1 | 2/2019 | Seo et al. |

FOREIGN PATENT DOCUMENTS

| | | |
|---|---|---|
| CN | 105340239 A | 2/2016 |
| CN | 105574402 | 5/2016 |
| CN | 106022091 | 10/2016 |
| CN | 106201490 | 12/2016 |
| CN | 106201683 | 12/2016 |
| CN | 106201684 A | 12/2016 |
| CN | 106529270 | 3/2017 |
| JP | 2014143555 | 8/2014 |
| JP | 2018508857 A | 3/2018 |
| WO | 2013055500 | 4/2013 |
| WO | 2014052069 | 4/2014 |
| WO | 2014179577 | 11/2014 |

OTHER PUBLICATIONS

About privacy and Location Services in iOS8 and later, https://support.apple.com/en-us/HT203033, Jan. 8, 2018, 6 pages.

Extended European Search Report issued in European Application No. 18871352.3 on Jul. 13, 2020, 9 pages.

How can I detect which background application is using the camera, microphone or GPRS? https://security.stackexchange.com/questions/40284/how-can-i-detect-which-background-application-is-using-the-cameramicrophone-or, Dec. 9, 2013, 2 pages.

How to check whether microphone is used by any background app, hllps://stackoverflow.com/questions/35633513/how-to-check-whether-microphone-is-used-by-any-background-app, Feb. 25, 2016, 2 pages.

Russell Holly, "Android apps can use your camera without you knowing," https://www.geek.com/android/android-apps-can-use-your-camera-without-you-knowing-1594579/, May 22, 2014, 2 pages.

Office Action issued in Japanese Application No. 2020-519057 on Jan. 4, 2022, 4 pages (with English translation).

Office Action issued in Chinese Application No. 201880068240.1 on Jun. 3, 2021, 16 pages (with English translation).

Office Action issued in Japanese Application No. 2020-519057 on Jun. 29, 2021, 9 pages (with English translation).

* cited by examiner

METHOD AND APPARATUS FOR MANAGING HARDWARE RESOURCE ACCESS IN AN ELECTRONIC DEVICE

CROSS-REFERENCE TO RELATED APPLICATIONS

This application is a continuation of U.S. patent application Ser. No. 15/795,101, filed on Oct. 26, 2017, the disclosure of which is hereby incorporated by reference in its entirety.

TECHNICAL FIELD

The present disclosure generally relates to the operation of electronic devices, and more specifically to a method and apparatus for manage hardware resource access in a mobile electronic device.

BACKGROUND

Currently available mobile electronic devices such as smartphones, tablet computers, and smart watches offer a rich and pleasing experience to end users with enriched communication capabilities as well as feature-rich software applications provided by such devices. However, some mobile devices can become infected with malicious software ("malware") that performs operations unbeknownst to the user. Detecting malware can be difficult due to the secretive nature of its operation.

SUMMARY

An example embodiment includes a method to manage hardware resource access on a mobile device comprising receiving first user input granting permission for a first application on the mobile device to access a first hardware resource of the mobile device and, based thereon, granting permission to the first application to access the first hardware resource; after granting permission to the first application to access the first hardware resource, detecting an attempt by the first application to access the first hardware resource when the application is executing in the background and based thereon: obtaining an first operational mode of the mobile device wherein the first operational mode comprises an indication of whether the mobile device is in a locked state or an unlocked state; determining that there is not a policy in a plurality of policies that grants permission for the first application to access the first hardware during the first operational mode; based on the determination, providing a notification requesting user input to grant or deny access to the first hardware resource by the first application; receiving second user input responsive to the notification; and adding, to the plurality of policies, a new policy to grant or deny access to the policies to the first hardware resource by the first application during the first operational mode according to the second user input.

Optionally, in any of the preceding embodiments, wherein the second user input grants access to the first hardware resource, the method further comprises granting access to the first application to access the first hardware resource.

Optionally, in any of the preceding embodiments, wherein the second user input denies access to the first hardware resource, the method further comprising denying access to the first application to access the first hardware resource.

Optionally, in any of the preceding embodiments, wherein the second user input denies access to the first hardware resource, the method further comprises denying access to the first application to access the first hardware resource.

Optionally, in any of the preceding embodiments, wherein the first hardware resource comprises microphone input, camera input, touch screen input, keyboard input, display output, haptic output, mobile device location information, or a proximity sensor reading.

Optionally, in any of the preceding embodiments, wherein the camera input is from an infrared cam era.

Optionally, in any of the preceding embodiments, the method further comprises receiving the plurality of policies from a server and sending the new policy to the server.

Optionally, in any of the preceding embodiments, the method wherein providing a notification requesting user input to grant or deny access comprises providing a graphical user interface on a display of the mobile device or providing a natural language message using an audio output of the mobile device.

Optionally, in any of the preceding embodiments, wherein the operational mode further comprises one or more of an indication of one or more other applications that are installed on the mobile device, an indication of one or more other applications that are currently executing on the mobile device, or a current location of the mobile device.

Optionally, in any of the preceding embodiments, the method further comprises determining that a period of time has elapsed since adding the new policy to the plurality of policies and, based thereon, removing the new policy from the plurality of policies.

Another embodiment includes a mobile electronic device comprising: a screen for displaying graphic information; a memory storing instructions; and one or more processors in communication with the memory and the screen, wherein the one or more processors being configured to execute the instructions to: receive first user input granting permission for a first application on the mobile device to access a first hardware resource of the mobile device and, based thereon, grant permission to the first application to access the first hardware resource; after granting permission to the first application to access the first hardware resource, detect an attempt by the first application to access the first hardware resource when the application is executing in the background and based thereon: obtain an first operational mode of the mobile device wherein the first operational mode comprises an indication of whether the mobile device is in a locked state or an unlocked state; determine that there is not a policy in a plurality of policies that grants permission for the first application to access the first hardware during the first operational mode; based on the determination, provide a notification requesting user input to grant or deny access to the first hardware resource by the first application; receive second user input responsive to the notification; and add, to the plurality of policies, a new policy to grant or deny access to the policies to the first hardware resource by the first application during the first operational mode according to the second user input.

Optionally, in any of the preceding embodiments, the mobile electronic device wherein the second user input grants access to the first hardware resource, the one or more processors being configured to grant access to the first application to access the first hardware resource.

Optionally, in any of the preceding embodiments, the mobile electronic device wherein the second user input denies access to the first hardware resource, the one or more processors being configured to deny access to the first application to access the first hardware resource.

Optionally, in any of the preceding embodiments, the mobile electronic device wherein the first hardware resource comprises microphone input, camera input, touch screen input, display output, haptic output, mobile device location information, or a proximity sensor reading.

Optionally, in any of the preceding embodiments, the mobile electronic device wherein the camera input is from an infrared camera.

Optionally, in any of the preceding embodiments, the mobile electronic device further comprises that the one or more processors being configured to receive the plurality of policies from a server and sending the new policy to the server.

Optionally, in any of the preceding embodiments, the mobile electronic device wherein providing a notification requesting user input to grant or deny access comprises providing a graphical user interface on a display of the mobile device or providing a natural language message using an audio output of the mobile device.

Optionally, in any of the preceding embodiments, the mobile electronic device wherein the operational mode further comprises one or more of an indication of one or more other applications that are installed on the mobile device, an indication of one or more other applications that are currently executing on the mobile device, or a current location of the mobile device.

Optionally, in any of the preceding embodiments, the mobile electronic device further comprises the one or more processors being configured to determine that a period of time has elapsed since adding the new policy to the plurality of policies and, based thereon, remove the new policy from the plurality of policies.

Optionally, in any of the preceding embodiments, the mobile electronic device.

DETAILED DESCRIPTION

Reference will now be made in detail to embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the embodiments may be practiced without these specific details or that various changes and substitutions can be made thereto without departing from the spirit and scope of the present disclosure. In other instances, well-known methods, procedures, components, and circuits have not been described in detail so as not to unnecessarily obscure aspects of the embodiments.

An application software or application program ("application") is a computer program designed to perform a group of functions, tasks, or activities for the benefit of the user. Examples of applications include word processors, spreadsheets, accounting software, web browsers, a media players, electronic games, or photograph editors, instance. This is in contrast with system software, such as an operating system, which manages the execution of applications on a computing device.

So called non-consensual tracking software such as malware can be installed on a computing device in a number of ways. For example, such tracking software may be installed on a computing device as a byproduct of installing another application on the computing device. The tracking software typically runs in the background and monitors one or more hardware resources of a computing device. Even if a computing device manufacturer has a high level of security there are still other ways for malware to be installed. For instance, malware may bypass security measures of system software in order to install a stealth tracking program that runs in the background. Malware applications may track a user's activities unbeknownst to the user by accessing hardware resources of the user's computing device such as a smartphone, a smart watch, a tablet or a portable computer.

A hardware resource is a physical hardware component of a computing device; input to, or output from (I/O), one or more of the physical hardware of the components; or data derived from I/O of the physical hardware components. By way of illustration, a physical hardware component can be a microphone, a proximity sensor, an image sensor, a touch screen, a physical button, a global positioning system (GPS) receiver, a cellular radio, a Wi-Fi radio, or a Bluetooth transceiver. Examples of I/O hardware components include microphone input, image sensor (e.g., camera) input, touch screen input, keyboard input, display output, haptic output, or a proximity sensor reading, etc. An example of data derived from I/O of physical hardware components is the geographic location ("geolocation") of the computing device which is based on information received by the GPS receiver and the Wi-Fi radio, for example. Other types of hardware resources are possible.

A computing device has different operational modes. In general, an operational mode is a Boolean expression that represents the state of a computing device when the computing device is powered on. The state of the computing comprises one or more of the following factors: whether a specified application is executing in the foreground or the background, whether the device is locked or unlocked; whether the device is in airplane mode or not; an indication of applications that are executing on the device; and a current geographic location of the device. That is, the operational mode a Boolean expression of the factors. When a computing device is in airplane mode, the computing device may suspend radio-frequency signal transmission (e.g., cellular, Wi-Fi and Bluetooth transmission). When a computing device is not in airplane mode, the computing device may work in a normal way, such as receiving and transmitting signals using cellular, Wi-Fi, and Bluetooth transmissions. The locked state may be used to prevent inadvertent operation of a touch screen display, e.g., while the device is in a user's pocket or purse or when another object is placed against the device. The locked state may also be used to prevent an unauthorized person from using the device. Generally, the device is programmed to enter the locked state when a user presses a specific button or a series of buttons or when it has been idle for a certain period of time. When a user desires to use a device that is in a locked state, the user may be required to utter an order, drag a slide bar, press a specific button or a series of buttons (e.g., to enter a password) to unlock the device.

Figure 1:
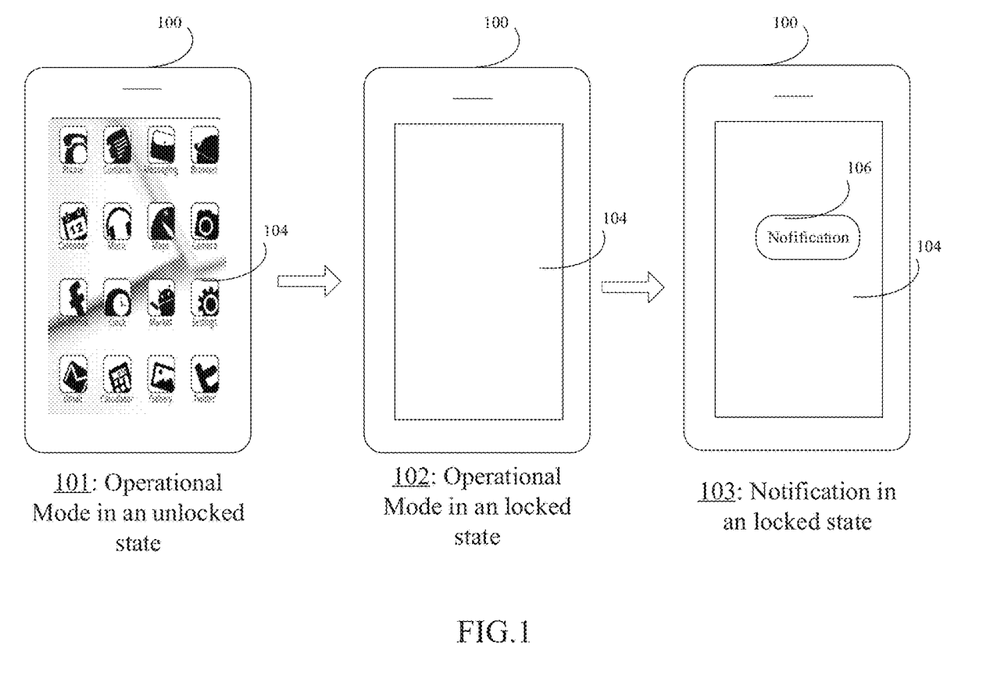
FIG. 1 illustrates examples of a mobile computing device 100 in different operational modes.

FIG. 1 illustrates examples of a mobile computing device 100 in different operational modes. The mobile computing device 100, e.g., computing device such as a smart phone, smart watch or a tablet device, is shown in an unlocked state operational mode 101 with a display 104 that provides a graphical user interface (GUI), in which applications on the mobile computing device are represented by user-selectable icons in the GUI. In a locked state operational mode 102, the mobile computing device display 104 can be powered off. Many functions may be suspended when the mobile computing device 100 is in a locked state. In another operational mode 103, a user notification 106 is presented on the display 104. The notification may be presented when the computing device 100 is in a locked or unlocked state in order to gain the attention of a user of the computing device 100. In some implementations, a notification is provided to the user of the computing device 100 to request input to grant or deny an application access to a hardware resource. Alternatively, or in addition to, the notification can be a voice message, a sound, or haptic feedback, for example. The display of the mobile electronic device may be activated to show a notification message as shown in 103. The notification message itself may be shown at the same time.

The present disclosure provides various embodiments of managing hardware resource access on a mobile device using policies so that as access to hardware resources may be controlled in a safe way as well as in a convenient way for the user.

An embodiment of the present disclosure provides that a device is configured with policies governing access to hardware resources. A policy is a rule that indicates whether a specified application is granted or denied access to a specified hardware resource on a computing device during a specified operational mode of the computing device. The policy may be saved in a file, e.g. an XML file, or a text or the like. The general form of a policy is: <application identifier, hardware resource identifier, operational mode Boolean expression, grant/deny> wherein the application identifier identifies an application, a hardware resource identifier identifies a hardware source (e.g., microphone, camera, etc.), and the operational mode is a Boolean expression of one or more of the factors described above. A policy may comprise a plurality of records, and each record may comprise a form of policy as described above. A policy is triggered when the application ID, hardware resource ID match respective IDs and when the operational mode expression evaluates to TRUE. When a policy is triggered, access to the identified hardware resource by the identified application is granted or denied based on the grant/deny field of the policy. Optionally, policies may have expiration times after which they are no longer active.

By way of illustration, TABLE 1 lists example policies.

TABLE 1

| Policy # | Application ID | Hardware Resource ID | Operational Mode | Grant/Deny |
|---|---|---|---|---|
| 1 | App 1 | Microphone | App 1 executing in background AND Camera app currently executing | Deny |
| 2 | App 1 | Location Services | App 1 executing in background AND Locked OR Airplane mode) | Deny |
| 3 | App 1 | Microphone | App 1 executing in background AND NOT Locked | Grant |
| 4 | App 2 | Location Services | App 2 executing in background | Deny |
| 5 | App 2 | Location Services | App 2 executing in foreground | Grant |
| 6 | App 3 | Camera | Locked state | Deny |
| 7 | App 3 | Camera | App 3 executing in foreground | Grant |

Each line in TABLE 1 may be an example policy, and the policy may be shown as one or more records. For example, regarding a first application (App 1) in TABLE 1, when the App 1 is executing in background, and a Camera app is currently executing, the App 1 intends to initiate action or access on a microphone, and such intention or access will be denied according to a first policy in TABLE 1, Line 1. A policy regards App 3, for example, when the App 3 is executing in foreground, and the App 3 intends to initiate action or access on a camera, such intention or access will be granted according to a second policy in TABLE 1, Line 7.

When an application attempts to access a hardware resource of the device, the device determines if one or more policies grant permission to the application to access the hardware resource. For example, when the access is not granted by a policy, either the application's access to the hardware resource is denied or a notification is provided to a user of the device requesting that the user grant or deny access to the hardware resource for the application. As noted above, such a notification can be message in a GUI of the computing device or a voice prompt. In the case where a notification is provided, the user's response to the notification is used to create a new policy. The new policy specifies the application, the hardware resource that the application attempted to access, a Boolean expression representing the operational mode of the computing device when the application attempted access, and an indication of whether the user granted or denied the access. When an attempt by the application to access the same hardware resource during the same operating mode, the policy will automatically grant permission to the application without the need to obtain user input.

Figure 2:
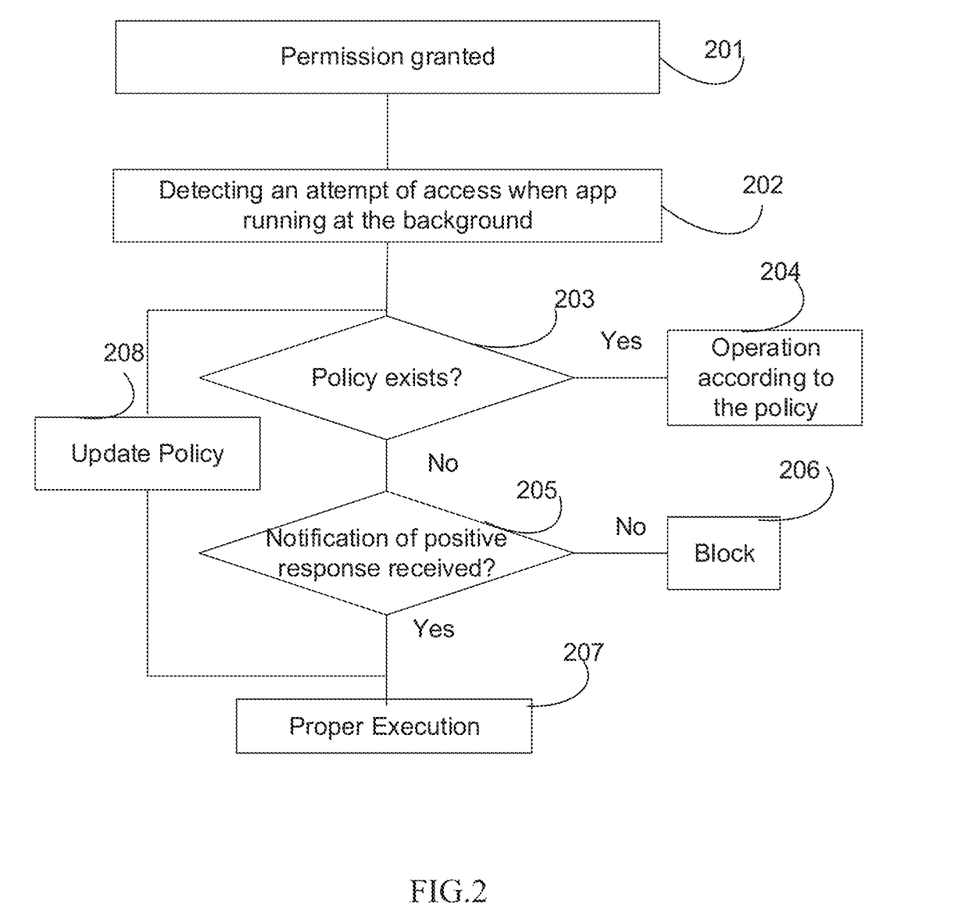
FIG. 2 is a flow chart that illustrates a computer-implemented technique for accessing a hardware resource of a mobile electronic device according to an embodiment of the present disclosure.

FIG. 2 is a flow chart that illustrates a computer-implemented technique for accessing a hardware resource of a mobile electronic device according to an embodiment of the present disclosure.

At step 201, permission for a first application to access a first hardware resource of the device 100 is received when installing the first application. The first application may be provided by the device 100 or an operating system manufacturer or a third party. Based thereon, at step 202, an attempt by the first application to access the first hardware resource when the first application is executing in the background is detected. And based thereon, a first operational mode of the mobile device 100 is obtained, wherein the first operational mode may comprise an indication of whether the mobile device is in a locked state or an unlocked state; at step 203, determining that if there is a policy in a plurality of policies that grants permission for the first application to access the first hardware resource during the first operational mode; at step 204, if a proper policy exists and an operation based on the policy may be executed accordingly; if there is no such policy exists, a notification is provided to request user input to grant or deny access to the first hardware resource by the first application; at step 205, a user input responsive to the notification is received; when the response to the notification is that the access is not allowed, the attempt of access by the first application will be blocked at step 206; otherwise, at step 207 a proper execution is performed for the first application; then at step 208, a new policy is added to the plurality of policies, to grant or deny access to the policies to the first hardware resource by the first application during the first operational mode according to the user input.

Figure 3:
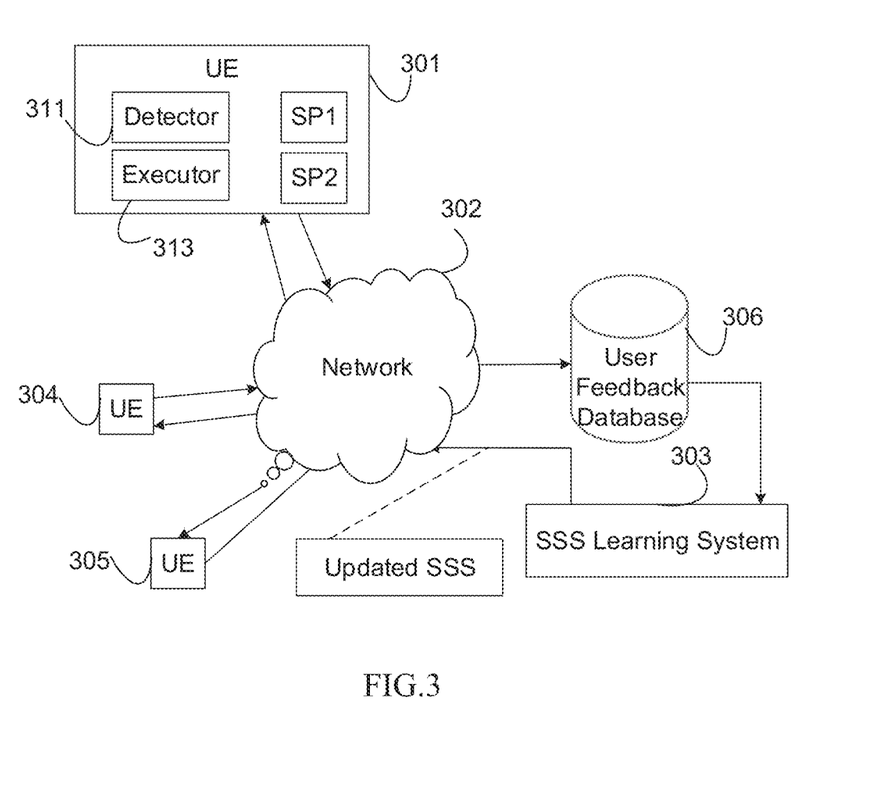
FIG. 3 is illustrates a system for resource management according to an embodiment of the present disclosure.

FIG. 3 is illustrates system for resource management comprising one or more mobile devices 301, 304, 305 interacting with a network 302 according to an embodiment of the present disclosure. The network 302 may be a cloud server, for example. Various embodiments of the present disclosure can be applied by the interactions of the mobile devices 301,304, 305 with the network 302.

A policy SP1 may be loaded to the mobile device 301 from the network 302. The SP1 may be a policy that most people have endorsed, or a policy that has been calculated through existing algorithm of optimistic selections of utility of an application, for example. A specified suspicious scenario (SSS) learning system 303 may be provided for the calculation of the policy SP1. The SSS learning system 303 may provide an updated policy periodically to the network 302. The SSS learning system 303 receives user data of preferences or results of using an application from various devices e.g. 301, 304, 305. The SSS learning system 303 may be an element in the network 302 or configured independently from the network 302. A database 306 may be configured to store user feedback data.

The calculation of policy SP1 may be a process of analyzing patterns of preferences from big data that has been collected from various devices 301, 304, and 305, such as working out an optimum policy out of the big data. The analysis may be based on preferences of a plurality of users, safe and not safe software knowledge learnt by a group of engineers, best effective way to present for the user etc. All SSS policy files can be stored in one xml file or a plurality of xml files in the database 306.

The mobile device 301, 304, 305 may upload its most recent policy SP2 periodically to the network 302 or the learning system 303. The uploading period may be daily or every a couple of days or may be configured by the mobile device 301, 304, 305.

A policy may comprise one or more policy file. A policy or a policy file may comprise one or more records showing what a policy is under a certain circumstance. The network 302 may update a default SSS policy file, based on various reports of SSS collected from various devices 301, 304, 305; then distribute the updated default SSS policy file to various devices 301, 304, 305. The default SSS policy file may be the policy SP1 as disclosed above. The updated default SSS policy file can be hereinafter defined as policy SP3. The cloud server 303 may load the policy SP3 to various devices 301, 304, 305. Once the various devices 301, 304, 305 receive the policy SP3, on-device policy SP1 can be replaced by the SP3.

A policy file may be read or detected by a detector of various devices 301, 304, 305, or a program on the various devices 301, 304, 305. The detector 311 may be coupled to an Application Programming Interface (API), The detector 311 may communicate through the API to an executor 313 of the various devices 301, 304, and 305 to perform executions according to the policy file. The detector 311 and the executor 313 may be a single program or separate programs running on the device 301, 304, 305.

The detector 311 or the program for detecting the SSS policy file may be defined as a computer program that runs as a background process, or a program under the direct control of an interactive user. A name may be defined for such a program in different environment, for example a daemon, a daemon process, a daemon program (DP), a ghost job, a service, started task or the like.

A parent process of a daemon is often, but may not be always, an initiating (init) process. A daemon is usually either created by a process forking a child process and then immediately exiting, thus causing init to adopt the child process, or launched by the init process directly. In addition, a daemon launched by forking and exiting typically may perform other operations, such as dissociating the process from any controlling terminal. Such procedures are often implemented in various convenient routines such as daemon in UNIX®.

Systems often start daemons at boot time which will respond to network requests, hardware resource activity, or other programs. Daemons may also perform defined tasks at scheduled times.

A daemon program (DP) can be an always running program, which may not need to call a certain operating system e.g., Android, for support. The daemon program however, may need to call the certain operation system to execute other programs on the operating system. Such other programs may be to pop up a dialogue on the screen of a device, and let users determine whether to grant process running-authorization under a defined SSS policy. The dialogue may be a notification that appears at an area in the screen of the mobile device as known to the user but not occupying a major display area. For example, instead of being an annoying popup message, a battery icon may be flash red momentarily or something the like.

The daemon program may monitor all resources of a device, e.g. microphone, camera, screen etc. The daemon program can be part of a user interface (UI).

The daemon program can be a proactive detector, which may not need special triggering by other programs of an operating system. A reacted detector, on the contrary to a proactive detector, may keep a sleeping or a standby status and need be triggered to function by an event or a program or the like.

An embodiment of the present disclosure provides a mobile electronic device that illustrates methods of managing hardware resource access as described above. A detector of the device is configured to load a first SSS policy file (SP1) to the device; listen for software and/or hardware component activities. The SP1 may be predefined by a manufacturer of a mobile device, or a carrier running a mobile network, or an operating system runner, or the SP1 may be loaded from a cloud server. A second SSS policy file (SP2) may be a local SSS policy, which may create records for the choice of preferences made by a user with the device. The mobile device can be configured as user-configuration preferred, such as the SP2 is with priority over SP1.

As disclosed above, the detector may be a first program, such as a daemon program (DP). When a change of system activity happens, the DP may detect and determine whether any SSS policy control is found. e.g., if it's the executing time as configured, and what the change is. If there is no SSS policy being found, DP may not do anything. If there is any SSS policy being found, then DP may proceed an inquiry to a second program. The second program may be a program of apk which is a program written in android operating system, or in java format, or any other format that may work for the similar purpose.

Figure 4:
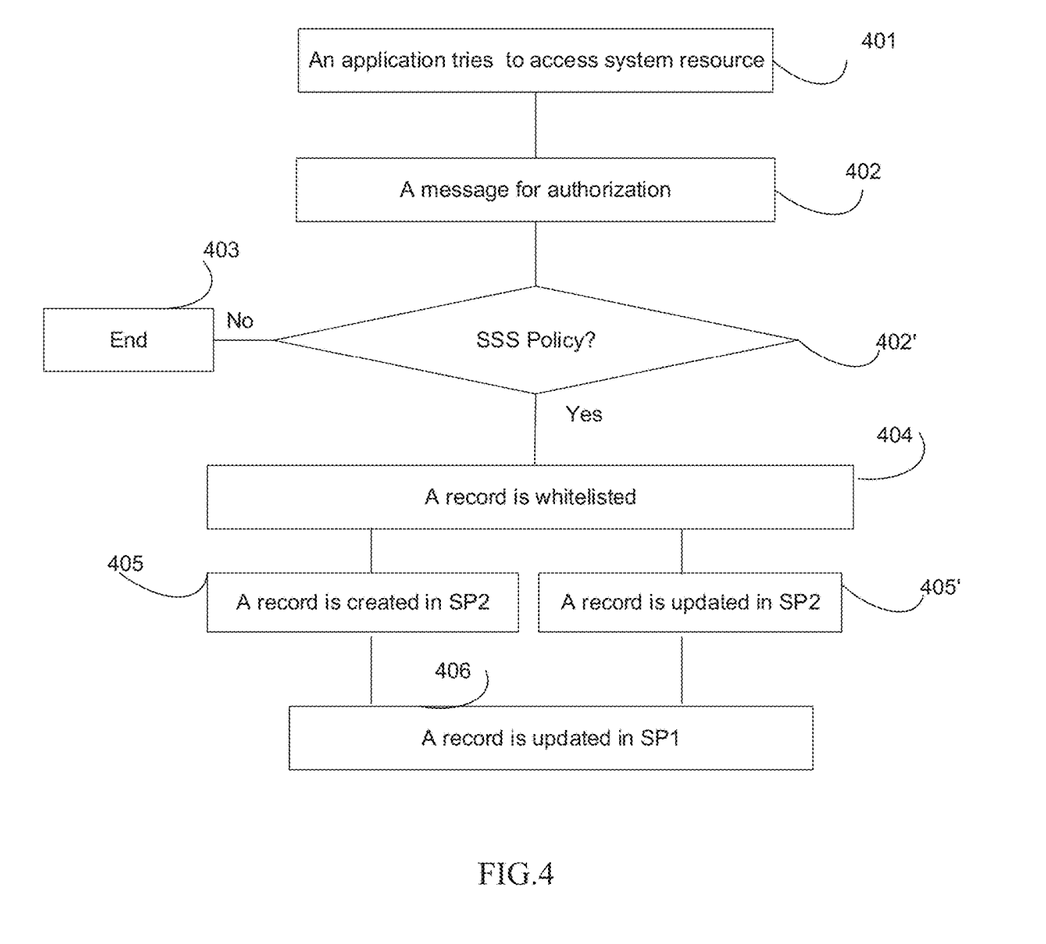
FIG. 4 is an example flow chart that illustrates a computer-implemented technique for accessing hardware resource of the mobile electronic device according to an embodiment of the present disclosure.

FIG. 4 is an example flow chart that illustrates a computer-implemented technique for accessing hardware resource of the mobile electronic device according to an embodiment of the present disclosure.

At step 401, an application tries to access system resources, such as a hardware resource.

At step 402, the DP asks an apk to post a message for authorization on a screen of the mobile device;

At step 402', determining whether to grant process running-right under defined SSS policy (SP1).

At step 403, when there is no SSS policy being found, DP may not do anything. Or when the running-right being not granted, the application is banned from executing.

At step 404, when the running-right being granted, then this combination of "app+found SSS policy" is whitelisted as a record for the SSS policy, the policy may be stored with an expiration date (ED). A whitelist may be a list that provides a particular privilege, service, mobility, access or recognition. Activities on the list will be accepted, approved and/or recognized. A whitelist may be the reverse of a blacklist. Activities on a blacklist may be denied, unrecognized, or ostracized.

At step 405, a record in a policy SP2 may be created comprising data such as the follows:

S40, App+hardware→SSS policy
S41, Expiration set-up→learning system

Such combinations like S40, or S41, may be called user permitted combination (UPC) or user combination (UC) which can be defined as the example shows as "app+found SSS policy" or the like; every UPC may have configured with an expiration date (ED).

When a UPC expires, DP may pop up a dialogue or a message or the like to ask user for permission for this UPC again; the DP may trigger an audio or the like to push an alert message to the user. If once again granted, ED can be updated too. A permission duration (PD) can be increased since it gets confirmed for a second time. The PD may be defined as a period of permission, e.g. a week, a month, forever etc. If not being granted, this UPC may be revoked.

At step 405', when an existing SP2 is detected, then updating the SP2 with the record as described in step 404.

User's preference may be collected with a selection by the user.

At step 406, SP1 may be updated with the whitelisted combination as described in step 404.

A mobile electronic device is produced to illustrate solutions as described in embodiments of the present disclosure.

Figure 5:
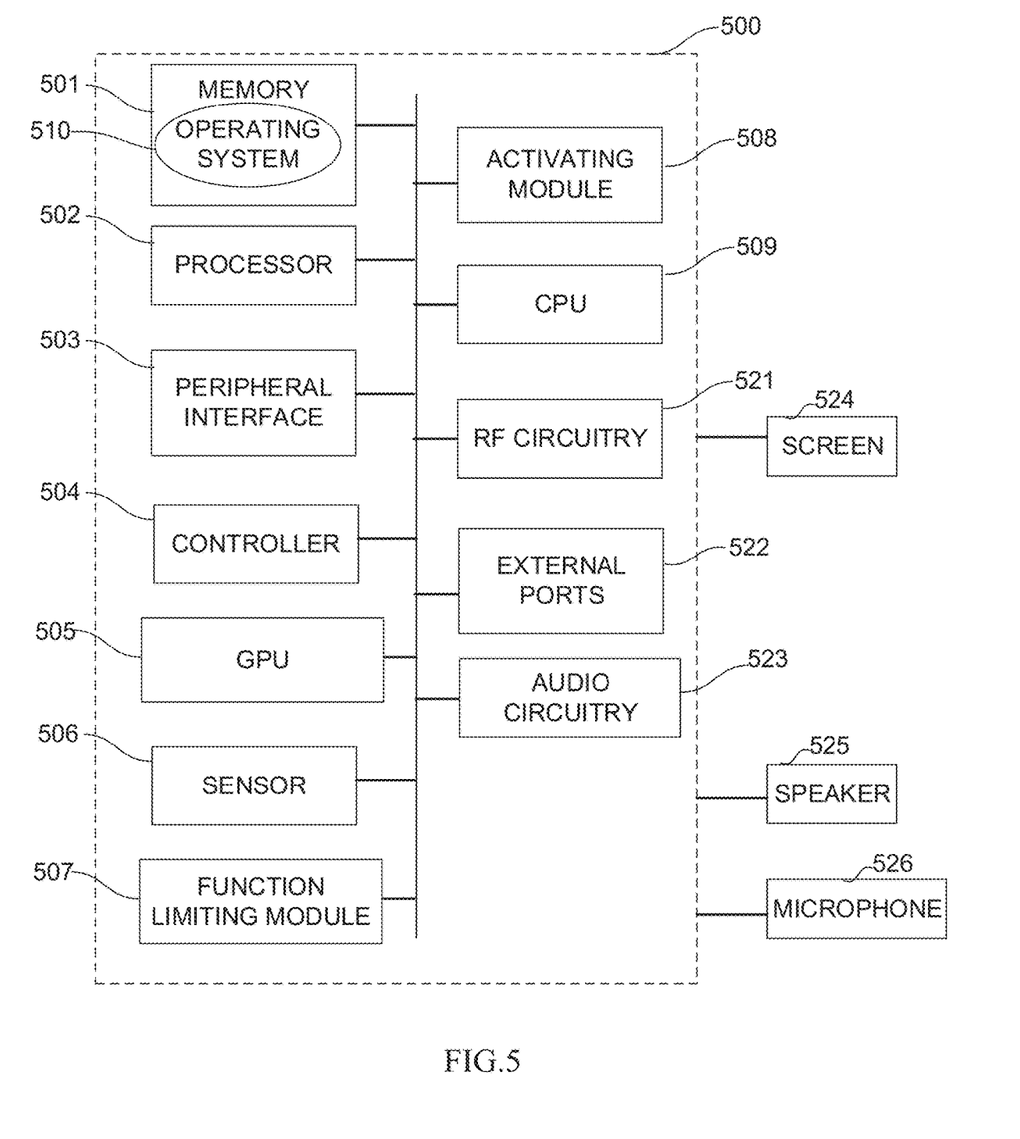
FIG. 5 is a block diagram illustrating components of a mobile electronic device 500 in accordance with an embodiment of the present disclosure.

FIG. 5 is a block diagram illustrating components of a mobile electronic device 500 in accordance with an embodiment of the present disclosure. The device 500 is configured to carry out embodiments as described above. The device 500 includes a memory 501, a processor 502, a peripherals interface 503, a memory controller 504, a graphics processing unit (GPU) 505, one or more sensors 506. The processor may also be coupled with a function limiting module 507, an activating module 508, and a central processing unit (CPU) 509. The CPU may also be coupled to the peripherals interface 503. The device may further comprise a Radio Frequency (RF) circuitry 521 which may comprise a wi-fi interface and/or a Bluetooth interface. The device 500 may further comprise one or more external ports 522, an audio circuitry 523 which may further connected with one or more speakers 525, and/or microphone 526. The device may further comprise a screen 524 which may be coupled with the peripherals interface 503. These components communicate over one or more communication buses or signal lines. The mobile electronic device 500 can be, for example, a handheld computer, a tablet computer, a mobile phone, a media player or a personal digital assistant (PDA). The various components shown in FIG. 5 may be implemented in hardware resource or a combination of hardware resource and software resource, including one or more signal processing and/or application specific integrated circuits.

In other embodiments of the present disclosure, the memory 501 may include storage remotely located from the mobile electronic device 500 such as the Internet, intranet(s), Local Area Networks (LANs), Wide Local Area Networks (WLANs), Storage Area Networks (SANs) and the like, or any suitable combination thereof.

The peripherals interface 503 couples the input and output peripherals of the device 500 to the CPU 509, the GPU 505 and the memory 501. The CPU 509 runs various software programs and/or sets of instructions stored in the memory 501 to perform various functions for the mobile electronic device 500 and to process data. The GPU 505 handles graphic processing functions for the screen 524. In some embodiments, the graphic processing functions are handled by the CPU 509, so the GPU 505 may be saved.

The external port 522 is adapted for coupling to other devices either directly or remotely over a network. For example, the external port 522 could comprise a Universal Serial Bus (USB), FireWire, memory slot for receiving an external storage medium, etc.

RF (radio frequency) circuitry 521 receives and sends RF signals, which may also be called electromagnetic signals. RF circuitry 521 converts electrical signals to/from electromagnetic signals and communicates with communications networks and other communications devices via the electromagnetic signals. RF circuitry 521 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 521 may communicate with networks, such as the Internet, an intranet and/or a wireless network, such as a cellular telephone network, a wireless local area network (LAN) and/or a metropolitan area network (MAN), and other devices by wireless communication. The wireless communication networks may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, or any other suitable communication protocol The audio circuitry 523 connects with one or more speakers 525 and a microphone 526. Together these components provide an audio interface between a user and the mobile electronic device 500. The audio circuitry 523 receives audio data from the peripherals interface 503, converts the audio data to an electrical signal, and transmits the electrical signal to the speaker(s) 525. The speaker(s) 525 converts the electrical signal to human-audible sound waves. The audio circuitry 190 also receives electrical signals converted by the microphone 526 from sound waves. The audio circuitry 523 converts the electrical signal to audio data and transmits the audio data to the peripherals interface 503 for processing. Audio data may be retrieved from and/or transmitted to the memory 501 and/or the RF circuitry 521 by the peripherals interface 503.

The screen 524 may be a touch-screen or a folded screen and provides both an output interface and an input interface between the device and a user. The screen 524 displays visual output to the user that may include text, graphics, video, and any combination thereof. Some or all of the visual output may correspond to user-interface objects, further details of which are described below. The screen 524 may use LCD (liquid crystal display) technology, or other known display technologies. The screen 524 also accepts input from the user based on haptic and/or tactile contact.

The operating system 510 stored in the memory 501 (e.g., Android, RTXC, Linux, UNIX®, Apple OS® X, Microsoft Windows®, or an embedded operating system such as VxWorks®) may include various software components and/or drivers for controlling and managing general system tasks (e.g., memory management, storage device control, power management, etc.) and facilitates communication between various hardware and software components. Although many kinds of operating systems may be applied, the following description will use Android as an example to describe embodiments of this invention. Various applications may be installed on the operating system 510.

The SSS policy may comprise one or more applications that may be communicated to a processor of the mobile electronic device by an API of the mobile electronic device. The SSS policy can be pre-configured or refined during operation from time to time.

In computer programming, an API is a set of subroutine definitions, protocols, and tools for building application software. In general terms, it is a set of clearly defined methods of communication between various software components. An API may be for a web-based system, operating system, database system, and computer hardware or software library. An API specification can take many forms, but often includes specifications for routines, data structures, object classes, variables or remote calls. POSIX, Microsoft Windows API, the C++ Standard Template Library and Java APIs are examples of different forms of APIs. Documentation for the API is usually provided to facilitate usage.

For example, a set of APIs in a graphics library defines how pointers are drawn and can be displayed on a graphical output device. When the application needs pointer function, it can be referenced to link to this set of APIs.

An API can specify the interface between an application and an operating system. POSIX, for example, specifies a set of common APIs that aim to enable an application written for a POSIX conformant operating system to be compiled for another POSIX conformant operating system. Linux and Berkeley Software Distribution are examples of operating systems that implement the POSIX APIs.

Remote APIs allow developers to manipulate remote resources through protocols, specific standards for communication that allow different technologies to work together, regardless of language or platform. For example, the Java Database Connectivity API allows developers to query many different types of databases with the same set of functions, while the Java remote method invocation API uses the Java Remote Method Protocol to allow invocation of functions that operate remotely, but appear local to the developer. Therefore, remote APIs are useful in maintaining the object abstraction in object-oriented programming; a method call, executed locally on a proxy object, invokes the corresponding method on the remote object, using the remote protocol, and acquires the result to be used locally as return value. A modification on the proxy object will also result in a corresponding modification on the remote object.

Web APIs are the defined interfaces through which interactions happen between an enterprise and applications that use its assets. An API approach is an architectural approach that revolves around providing programmable interfaces to a set of services to different applications serving different types of consumers. When used in the context of web development, an API is typically defined as a set of Hypertext Transfer Protocol (HTTP) request messages, along with a definition of the structure of response messages, which is usually in an Extensible Markup Language (XML) or JavaScript Object Notation (JSON) format. An example might be a shipping company API that can be added to an e-Commerce-focused web site, to facilitate ordering shipping services and automatically include current shipping rates, without the site developer having to enter the shipper's rate table into a web database. While "web API" historically has been virtually synonymous for web service, the recent trend (so-called Web 2.0) has been moving away from Simple Object Access Protocol (SOAP) based web services and service-oriented architecture (SOA) towards more direct representational state transfer (REST) style web resources and resource-oriented architecture (ROA). Part of this trend is related to the Semantic Web movement toward Resource Description Framework (RDF), a concept to promote web-based ontology engineering technologies. Web APIs allow the combination of multiple APIs into new applications known as mash-ups. In the social media space, web APIs have allowed web communities to facilitate sharing content and data between communities and applications. In this way, content that is created in one place can be dynamically posted and updated in multiple locations on the web.

Although the present disclosure has been described with reference to specific features and embodiments thereof, it should be understood that various changes and substitutions can be made thereto without departing from the spirit and scope of the present disclosure as defined by the following claims.

What is claimed is:

1. A method to manage hardware resource access on a mobile device, the method comprising:
setting a plurality of policies of the mobile device to grant or deny permission to a first application to access a first hardware resource, wherein the first hardware resource is a camera of the mobile device or a microphone of the mobile device;

while the plurality of policies are set, detecting a first attempt by the first application to access the first hardware resource;

in response to detecting the first attempt by the first application to access the first hardware resource while the plurality of policies are set, determining that the first application is executing in a background of the mobile device;

determining whether a first policy that grants or denies permission for the first application to access the first hardware resource when executing in the background of the mobile device exists in the plurality of policies;

when determining that the first policy does not exist in the plurality of policies, denying the first application access to the first hardware resource;

when determining that the first policy exists in the plurality of policies, granting or denying the first application access to the first hardware resource based on the first policy;

while the plurality of policies are set, detecting a second attempt by the first application to access the first hardware resource;

in response to detecting the second attempt by the first application to access the first hardware resource while the plurality of policies are set, determining that the mobile device is in a locked state;

determining whether a second policy that grants or denies permission for the first application to access the first hardware resource when the mobile device is in the locked state exists in the plurality of policies;

when determining that the second policy does not exist in the plurality of policies, denying the first application access to the first hardware resource; and when determining that the second policy exists in the plurality of policies, granting or denying the first application access to the first hardware resource based on the second policy.

2. The method of claim 1, further comprising:
while the plurality of policies are set, detecting a third attempt by the first application to access the first hardware resource;
in response to detecting the third attempt by the first application to access the first hardware resource while the plurality of policies are set, determining that the first application is not executing in the background of the mobile device and that the mobile device is not in the locked state; and
granting the first application access to the first hardware resource in response to determining that the first application is not executing in the background of the mobile device and that the mobile device is not in the locked state.

3. The method of claim 1, further comprising:
providing a notification requesting user input to grant or deny access to the first hardware resource by the first application in response to the first attempt;
receiving user input to grant access to the first hardware resource responsive to the notification; and
generating a new policy to grant access to the first hardware resource by the first application according to the user input.

4. The method of claim 3, further comprising granting access to the first application to access the first hardware resource while executing in the background of the mobile device according to the new policy.

5. The method of claim 3, wherein providing the notification requesting user input to grant or deny access comprises providing a graphical user interface on a display of the mobile device or providing a natural language message using an audio output of the mobile device.

6. The method of claim 3, further comprising:
determining that a period of time has elapsed since generating the new policy; and
deleting the new policy.

7. The method of claim 1, further comprising:
providing a notification requesting user input to grant or deny access to the first hardware resource by the first application in response to the second attempt;
receiving user input to grant access to the first hardware resource responsive to the notification; and
generating a new policy to grant access to the first hardware resource by the first application according to the user input.

8. The method of claim 7, further comprising granting access to the first application to access the first hardware resource while the mobile device is in the locked state according to the new policy.

9. The method of claim 7, wherein providing the notification requesting user input to grant or deny access comprises providing a graphical user interface on a display of the mobile device or providing a natural language message using an audio output of the mobile device.

10. The method of claim 7, further comprising:
determining that a period of time has elapsed since generating the new policy; and
deleting the new policy.

11. The method of claim 1, wherein the plurality of policies comprise a plurality of records, and wherein each record comprises a rule that indicates whether a specified application is granted or denied access to a specified hardware resource of the mobile device.

12. The method of claim 1, wherein the plurality of policies comprise granting permission to the first application to access the first hardware resource when the mobile device is located in a first geographic location.

13. The method of claim 12, further comprising in response to detecting the first attempt by the first application to access the first hardware resource, determining that the mobile device is not located in the first geographic location.

14. The method of claim 1, wherein the plurality of policies are calculated by a specified suspicious scenario (SSS) learning system based on at least user feedback data.

15. A mobile electronic device, comprising:
a display;
a memory storing instructions; and
one or more processors in communication with the memory and the display, wherein the one or more processors are configured to execute the instructions to:
set a plurality of policies of the mobile electronic device to grant or deny permission to a first application to access a first hardware resource, wherein the first hardware resource is a camera of the mobile electronic device or a microphone of the mobile electronic device;
while the plurality of policies are set, detect a first attempt by the first application to access the first hardware resource;
in response to detecting the first attempt by the first application to access the first hardware resource while the plurality of policies are set, determine that the first application is executing in a background of the mobile electronic device;
determine whether a first policy that grants or denies permission for the first application to access the first hardware resource when executing in the background of the mobile device exists in the plurality of policies;
when determining that the first policy does not exist in the plurality of policies, deny the first application access to the first hardware resource;
when determining that the first policy exists in the plurality of policies, grant or deny the first application access to the first hardware resource based on the first policy;
while the plurality of policies are set, detect a second attempt by the first application to access the first hardware resource;
in response to detecting the second attempt by the first application to access the first hardware resource while the plurality of policies are set, determine that the mobile electronic device is in a locked state;
determine whether a second policy that grants or denies permission for the first application to access the first hardware resource when the mobile device is in the locked state exists in the plurality of policies;
when determining that the second policy does not exist in the plurality of policies, deny the first application access to the first hardware resource; and
when determining that the second policy exists in the plurality of policies, grant or deny the first application access to the first hardware resource based on the second policy.

16. The mobile electronic device of claim 15, wherein the one or more processors are configured to execute the instructions to:
while the plurality of policies are set, detect a third attempt by the first application to access the first hardware resource;
in response to detecting the third attempt by the first application to access the first hardware resource while the plurality of policies are set, determine that the first application is not executing in the background of the mobile electronic device and that the mobile electronic device is not in the locked state; and
grant the first application access to the first hardware resource in response to determining that the first application is not executing in the background of the mobile electronic device and that the mobile electronic device is not in the locked state.

17. The mobile electronic device of claim 15, wherein the one or more processors are configured to execute the instructions to:
provide a notification requesting user input to grant or deny access to the first hardware resource by the first application in response to the first attempt;
receive user input to grant access to the first hardware resource responsive to the notification; and
generate a new policy to grant access to the first hardware resource by the first application according to the user input.

18. The mobile electronic device of claim 17, wherein the one or more processors are configured to execute the instructions to grant access to the first application to access the first hardware resource while executing in the background of the mobile electronic device according to the new policy.

19. The mobile electronic device of claim 17, wherein providing the notification requesting user input to grant or deny access comprises providing a graphical user interface on a display of the mobile electronic device or providing a natural language message using an audio output of the mobile electronic device.

20. The mobile electronic device of claim 17, wherein the one or more processors are configured to execute the instructions to:
determine that a period of time has elapsed since generating the new policy; and
remove the new policy from a plurality of policies.

21. The mobile electronic device of claim 15, wherein the one or more processors are configured to execute the instructions to:
provide a notification requesting user input to grant or deny access to the first hardware resource by the first application in response to the second attempt;
receive user input to grant access to the first hardware resource responsive to the notification; and
generate a new policy to grant access to the first hardware resource by the first application according to the user input.

22. The mobile electronic device of claim 21, wherein the one or more processors are configured to execute the instructions to grant access to the first application to access the first hardware resource while the mobile electronic device is in the locked state according to the new policy.

23. The mobile electronic device of claim 21, wherein providing the notification requesting user input to grant or deny access comprises providing a graphical user interface on a display of the mobile electronic device or providing a natural language message using an audio output of the mobile electronic device.

24. The mobile electronic device of claim 21, wherein the one or more processors are configured to execute the instructions to:
determine that a period of time has elapsed since generating the new policy; and
remove the new policy from a plurality of policies.

25. The mobile electronic device of claim 15, wherein the plurality of policies comprise a plurality of records, and wherein each record comprises a rule that indicates whether a specified application is granted or denied access to a specified hardware resource of the mobile electronic device.

26. The mobile electronic device of claim 15, wherein the plurality of policies comprise granting permission to the first application to access the first hardware resource when the mobile electronic device is located in a first geographic location.

27. The mobile electronic device of claim 26, wherein, in response to detecting the first attempt by the first application to access the first hardware resource, the one or more processors execute the instructions to determine that the mobile electronic device is not located in the first geographic location.

* * * * *

UNITED STATES PATENT AND TRADEMARK OFFICE
CERTIFICATE OF CORRECTION

PATENT NO. : 12,056,240 B2  
APPLICATION NO. : 17/062132  
DATED : August 6, 2024  
INVENTOR(S) : Paihan Huang, Maoter Chen and I-Hsuan Yang

Page 1 of 1

It is certified that error appears in the above-identified patent and that said Letters Patent is hereby corrected as shown below:

On the Title Page

In Column 1 (Assignee), In Line 1, Delete "Inc." and insert -- Inc., Plano (US) --.

Signed and Sealed this  
Nineteenth Day of November, 2024

Katherine Kelly Vidal  
*Director of the United States Patent and Trademark Office*